United States Patent
Baraz

(10) Patent No.: US 6,360,316 B1
(45) Date of Patent: Mar. 19, 2002

(54) METHOD FOR FAST DETECTION OF MUTUALLY EXCLUSIVE PREDICATED INSTRUCTIONS

(75) Inventor: Leonid Baraz, Kiryat-Ata (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/334,841

(22) Filed: Jun. 16, 1999

(51) Int. Cl.[7] .................................. G06F 9/318
(52) U.S. Cl. ................. 712/226; 712/234; 712/219; 712/214
(58) Field of Search ................. 712/234, 226, 712/216–219, 214–215

(56) References Cited

U.S. PATENT DOCUMENTS 6,009,512 A * 12/1999 Christie ................. 712/226
6,170,052 B1 * 1/2001 Morrison ................. 712/236
6,230,258 B1 * 5/2001 Takayama et al. ........... 712/226

* cited by examiner

*Primary Examiner*—Richard L. Ellis
*Assistant Examiner*—Gautam R. Patel
(74) *Attorney, Agent, or Firm*—Blakely, Sokoloff, Taylor & Zafman LLP

(57) ABSTRACT

A method for detecting independent predicated instructions comprises associating all instructions within a block of code with true and false bit vectors that have bit locations corresponding to instructions that produce pairs of mutually exclusive predicates. A computation is performed in which the true bit vectors associated with the first and second instructions are EXCLUSIVE-ORed to produce a first result. The false bit vectors associated with the first and second instructions are EXCLUSIVE-ORed to produce a second result. The first and second results are then ANDed to produce a third result. If the third result is a non-zero result, the first and second instructions are independent.

22 Claims, 6 Drawing Sheets

| | | |
|---|---|---|
| (p7) | cmp.eq.unc | p8, p9 = r12, r13 |
| (p8) | add | r14, = 8, r15 |
| (p9) | add | r14, = -8, r15 |
| (p8) | mov | r16 = r17 |
| (p9) | mov | r17 = r16 |

FIG. 1

| | | |
|---|---|---|
| (p4) | I0 instruction | |
| (p4) | cmp.eq.unc | P7, P8 = . . . |
| (p7) | I1 instruction | |
| (p8) | I2 instruction | |

FIG. 2

```
                cmp       p1, p2 =
                 . . .
        (p2)    cmp.unc   p3, p4 =
        (p3)     . . .
        (p4)     . . .
        (p2)    cmp.unc   p5, p6 =
        (p5)     . . .
        (p6)     . . .
        (p2)     . . .
        (p1)    cmp.unc   p7, p8 =
        (p7)     . . .
        (p8)     . . .
                cmp       p9, p10 =
        (p9)     . . .
        (p10)    . . .
```

FIG. 4

```
              cmp          p1, p2 = . . .

. . .

(p1)      cmp.unc      p5, p6 = . . .

. . .

(p6)      cmp.eq.or    p2 = r0, r0

. . .

(p2)      cmp.unc      p3, p4 = . . .

. . .

(p3)      cmp.eq.or    p5 = r0, r0
              . . .
```

FIG. 6

METHOD FOR FAST DETECTION OF MUTUALLY EXCLUSIVE PREDICATED INSTRUCTIONS

RELATED APPLICATIONS

The present application is related to pending applications Ser. No. 09/224,406 filed Dec. 31, 1998; Ser. No. 09/129,141 filed Aug. 4, 1998; and Ser. No. 09/224,414 filed Dec. 31, 1998, which applications are assigned to the assignee of the present application.

FIELD OF THE INVENTION

The present invention relates to the field of computers and instruction code for execution on computer systems. In particular, the invention relates to computer architectures that allow the execution of instructions within the code to be predicated by a bit value.

BACKGROUND OF THE INVENTION

The performance of a computer system is often a function of how well the processor manipulates and controls the flow data within the system. Over the past several decades engineers and researchers have been striving to find ways to increase the speed and throughput of instructions executed by the processor of a computer system. In more recent years, machines such as the Pentium® Pro™ processor have achieved increased performance by executing instructions out of their original program order. By scheduling instructions according to the availability of machine resources, the processor was allowed to take advantage of parallelism inherent in the code.

Another technique employed by computer architects to increase processor speed and throughput is known as predication. Predication refers to the conditional execution of instructions, depending on the value of a predicate. For example, modern processor architectures allow most instructions in the code to be predicated by one-bit value, which is typically stored in an associated predication register. The predicated instruction is executed only if the predicate register has a "true" value. Conversely, if the predicate register value is "false", the instruction is ignored, i.e., it is treated essentially as being equivalent to a no-operation instruction (NOP). Another possibility is to enable predication by either (predicate) or (NOT predicate), but this method is not widely used.

Consider the sequence of instructions listed below.

cmp r1=r2→p2

(p2) add r3+r4→r5

The first instruction determines a value for the predicate (p2) based on a comparison of the operands r1 and r2. If the value of register r1 is equal to the value of register r2, then the value of predicate p2 is true. On the other hand, if the values of r1 and r2 are not equal, then p2 is false. (True and false are typically represented in the processor as single bit values "1" and "0", respectively.)

The second instruction includes two parts. The first part (p2) predicates or conditions the second part (the addition of the contents of two registers) on the value of predicate p2. If p2 is true (e.g., "1") then the value of r5 is set equal to the value of r3+r4. But if p2 is false (e.g., "0") then the second part of the instruction is skipped (i.e., treated as a NOP). The processor then continues to execute the next instruction in the programmed code sequence.

Predicated instructions are very useful in that they allow the merging of two or more flows of control while avoiding conditional branches, which are expensive in terms of time consumption and resource usage if mispredicted. To realize the gains offered by predication, however, the code generator must schedule predicated instructions properly, so that instructions predicated by mutually exclusive predicates are marked independent, even if they reference the same registers. That is, it two instructions use the same register, or relate to memory, it is helpful to know whether it is possible to swap the two instructions for scheduling purposes. It, for instance, the same register is read in both instructions, this means that the two instructions can be swapped from the original program order.

In the case where a first instruction writes to a register and a second instruction reads from the same register, it means that the two instructions cannot be swapped. But if each instruction has a predicate, and the predicates are different and can never be true together, then swapping is permitted. Two instructions that are predicated by two mutually exclusive predicate registers are completely independent, regardless of any potential dependencies implied by their operands. In other words, because they are mutually exclusive, no dependencies are produced between the two instructions despite the fact that they use the same registers. It should be understood that if the two instructions were not predicated, dependencies would be produced and the instructions could not be swapped out of their original program order.

Consider the code listing shown in FIG. 1, which includes two 'add' instructions in sequence along with two 'mov' instructions. The first 'add' instruction, for example, performs an addition operation in which the number 8 is added to the contents of register r15. The result is placed in destination register r14. The second 'add' instruction also affects the contents of r14. Similarly, each of the 'mov' instructions references the contents of registers r16 and r17. Note that in this case, however, the two 'add' and two 'mov' instructions may be safely placed in the same issue group, although they affect the same registers and would form a hazard if they did not have predicates.

When emitting, optimizing and scheduling a code hyperblock (having one entry and one or more exits) containing predicated instructions, it is very important to recognize such pairs of independent instructions. To ensure that two instructions are truly independent, not only must the two instructions be considered but also the producers of their predicates as well. Determining dependencies between instructions is a time consuming aspect of scheduling in prior art machines, and deciding whether predicates invalidate dependence slows things down even more.

Known methods for verifying independence of such pairs of instructions generally try to keep track of all predicate pairs together with the producers. One known method maintains a database of mutually exclusive predicate pairs. A drawback of this approach, however, is that the database needs to be updated for every instruction that affects at least one predicate. Such prior methods that require updating of checking of data tend to be very time consuming, therefore expensive in terms of processor performance.

Thus, there exists an unsatisfied need for an apparatus and method that is capable of detecting independent predicated instructions in a fast, efficient manner.

SUMMARY OF THE INVENTION

The present invention provides a method for detecting independent predicated instructions. In one embodiment, the method comprises associating all instructions within a block of code with true and false bit vectors. The true and false bit vectors have bit locations that correspond to instructions that produce pairs of mutually exclusive predicates. The following formula is then computed.

$$(I1VecTrue \char`\^ I2VecTrue) \& (I1VecFalse \char`\^ I2VecFalse)!=0$$

In this formula, I1VecTrue and I2VecTrue represent true bit vectors respectively associated with first and second instructions in the block of code. I1VecFalse and I2VecFalse represent false bit vectors associated with the first and second instructions, respectively. In the case where the above formula produces a non-zero result, the first and second instructions are independent, regardless of the two instructions' operands.

BRIEF DESCRIPTION OF THE DRAWINGS

The present invention will be understood more fully from the detailed description which follows and from the accompanying drawings, which however, should not be taken to limit the invention to the specific embodiments shown, but are for explanation and understanding only.

FIG. 1 is an example instruction sequence illustrating the problem solved by the present invention.

FIG. 2 is an example instruction listing (associated with the diagram of FIG. 3).

FIG. 4 is another example instruction listing (associated with the diagram of FIG. 5).

FIG. 6 is yet another example instruction listing (associated with the diagram of FIG. 7).

DETAILED DESCRIPTION

Figure 3:
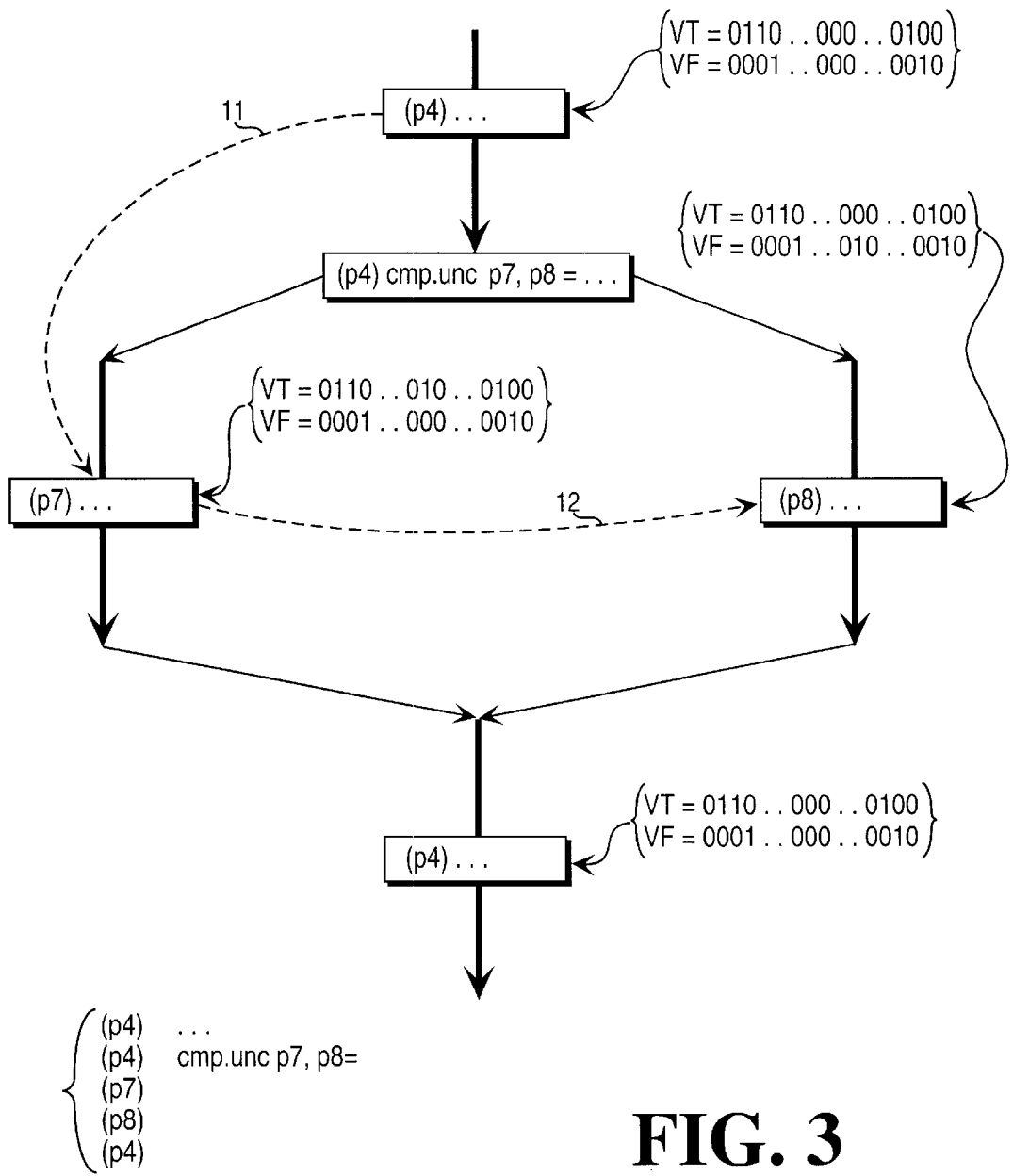
FIG. 3 is a diagram of bit vectors and possible dependencies that illustrates the present invention (simple hammock example).

A fast method of independent predicated instruction detection is described. In the following description numerous specific details are set forth, such as specific signal states, bit values, code listings, etc.; in order to provide a thorough understanding of the present invention. It will be obvious, however, to one skilled in the art, that these specific details may not be needed to practice the present invention.

The present invention provides a simple, elegant way to keep track of the values of predicates, so that it can easily be determined whether two instructions (which may be consecutive, or separated, within the code) are independent. The present invention therefore allows optimization of the scheduling process within the processor. Note that in cases where there is no common register between two instructions, there is no problem. However, when there is a register commonly referenced by two instructions, the following method may be performed.

At the point in the code where there is a compare ('cmp') instruction, a new bit value is assigned to each of two vectors. The two bit vectors are utilized to characterize a prediction status for each instruction and each predicate register. The two bit vectors are denoted as "VecTrue" and "VecFalse" (in the Figures as "VT" and "VF", respectively). Every predicate is assigned to such vectors. Each 'cmp' (or 'tbit') instruction that produces two mutually exclusive predicates is assigned a new bit location within both of these vectors. The corresponding bit is set to 1 in VecTrue for TRUE predicate and all its "descendants", and in VecFalse for FALSE predicate (i.e., VecTrue[i] & VecFalse[i]==0; where "&" indicates a logical AND operation, and i represents a position of a newly assigned bit).

Thus, the bit vectors—any given point throughout the scan of the code block—have values that describe its mutual exclusivity against other predicates.

It should be understood that the size of the bit vectors may be arbitrary. In one implementation, a processor machine word is utilized as a bit vector representation. In this implementation the machine word size is 64 bits. For this embodiment, therefore, up to 64 predicate pairs can be maintained for a single hyper-block.

Initially, there is only a p0 predicate, which is always TRUE in one embodiment of a processor in accordance with the present invention. The p0 predicate has all bits preset to zeros. All other predicates are marked "unknown" and are excluded from the analysis on mutual exclusivity. Every time an instruction that produces a mutually exclusive predicate pair is detected, a new bit position is assigned to each of the bit vectors. This new bit is set to "1" in VecTrue and VecFalse vectors for "true" and "false" predicates, respectively. Other bits are copied from the VecTrue and VecFalse vectors of the qualifying predicate of "cmp". These assigned vectors are later associated with all instructions predicated by these two predicates. In the case with the same predicate is later overwritten, its vectors are replaced by new ones, but the earlier instructions preserve their old vectors.

According to the method of the present invention, two instructions I1 and I2 are independent of one another (i.e., no dependence) if the following expression is true.

$$(I1VecTrue \char`\^ I2VecTrue) \& (I1VecFalse \char`\^ I2VecFalse)!=0;$$

In the above expression, I1VecTrue and I2VecTrue are true bit vectors associated with instructions I1 and I2, and I1VecFalse and I2VecFalse are false bit vectors associated with instructions I1 and I2 (according to their predicates), respectively. If so, the first and second instructions are independent. The notation "&" indicates a logical AND operation; "^" indicates an EXCLUSIVE-OR operation; and "!=0" means that the result is a non-zero value. To put it another way, when the above expression is not equal to zero the two predicates are assured of being mutually exclusive. A non-zero result means that the resulting vector does not have all positions set to zero.

To better understand the above expression, it is worth noting that the (I1VecTrue^I2VecTrue) bits are set only for those predicate pairs in which either I1 or I2 "used" the corresponding TRUE predicate, but not both of them. Similarly, the (I1VecFalse^I2VecFalse) bits are set only when either I1 or I2 "used" the corresponding FALSE predicate. Therefore, logically ANDing these two vector results produces non-zero bits only if I1 and I2 depend on the mutually exclusive predicates.

Should be understood that if the above expression is equal to zero, it does not necessarily mean that I1 and I2 are dependent. The reason why is because one would have to compare and analyze the input and output operands for each of the two instructions to be sure that the instructions are dependent. However, a non-zero result obviates the need to continue the analysis: I1 and I2 are independent, regardless of the two instructions' operands.

Referring now to FIG. 3, there is shown a diagram of bit vectors and possible dependencies that illustrate the method of the present invention. FIG. 3 is a simple hammock example that includes the sequential code listing of FIG. 2. Note that each downward pointing vertical arrow in the diagram represents a portion of the code. For this example, p4 has associated bit vectors,

VT=0110 . . . 000 . . . 0100

VF=0001 . . . 000 . . . 0010 and new compare instruction is assigned the center bit position.

The predicate p7 receives bit vectors,

VT=0110 . . . 010 . . . 0100

VF=0001 . . . 000 . . . 0010 while p8 (FALSE predicate) receives bit vectors,

VT=0110 . . . 000 . . . 0100

VF=0001 . . . 010 . . . 0010

The determination of whether the I2 instruction may depend on the I1 instruction is indicated in FIG. 3 by dashed arrow 12. Applying the expression produces $$VT1 \wedge VT2 = 0000 \ldots 010 \ldots 0000$$
$$VF1 \wedge VF2 = \underline{0000 \ldots 010 \ldots 0000}$$
$$0000 \ldots 010 \ldots 0000$$

which is a non-zero result, indicating no dependence. In other words, a dependence between I1 and I2 is impossible.

A similar analysis may be performed to determine whether instruction I1 may depend on instruction I0. This analysis is indicated in FIG. 3 by dashed line 11, which produces $$VT1 \wedge VT2 = 0000 \ldots 010 \ldots 0000$$
$$VF1 \wedge VF2 = \underline{0000 \ldots 000 \ldots 0000}$$
$$0000 \ldots 000 \ldots 0000$$

Because the result is zero there is a possible dependence between the two instructions. For this example, the foregoing analysis shows that p4 and p7 are not mutually exclusive, whereas p7 and p8 are mutually exclusive. Detecting a possible dependence through application of the method of the present invention precludes swapping of the two instructions during scheduling.

Figure 5:
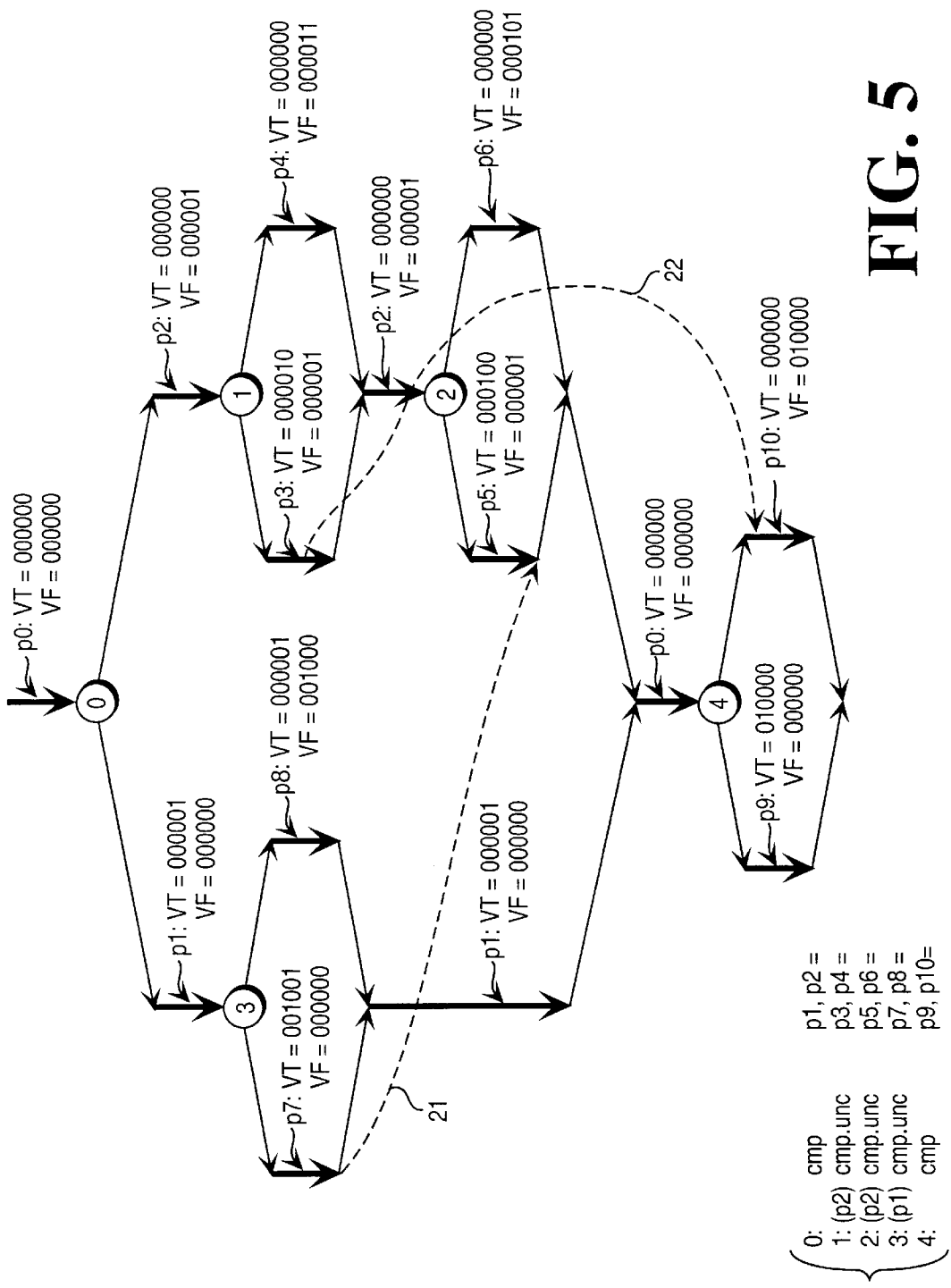
FIG. 5 is a diagram of bit vectors and possible dependencies that illustrates the present invention (forks and joins example).

FIG. 5 (corresponding to the code listing of FIG. 4) shows a more complicated example in which compare instructions are dependent on each other. This example is referred to as a nested hammock. Each of the five different compare instructions are represented in the diagram of FIG. 5 by the encircled numbers (i.e., 0–4).

Application of the formula provides a fast determination whether a possible dependency exists between any two instructions. By way of example, dashed line 21 represents a determination of possible dependence between the predicated instructions p7 and p5. In this case, the expression of the present invention produces a non-zero result.

$$VT1 \wedge VT2 = 001101$$
$$VF1 \wedge VF2 = \underline{000001}$$
$$000001$$

Hence, the two instructions have no dependence. In contrast, performing the analysis between p3 and p10 (dashed line 22) produces a zero result.

$$VT1 \wedge VT2 = 000010$$
$$VF1 \wedge VF2 = \underline{010001}$$
$$000000$$

As explained previously, a zero result means that there is a possible dependence between the two instructions.

Figure 7:
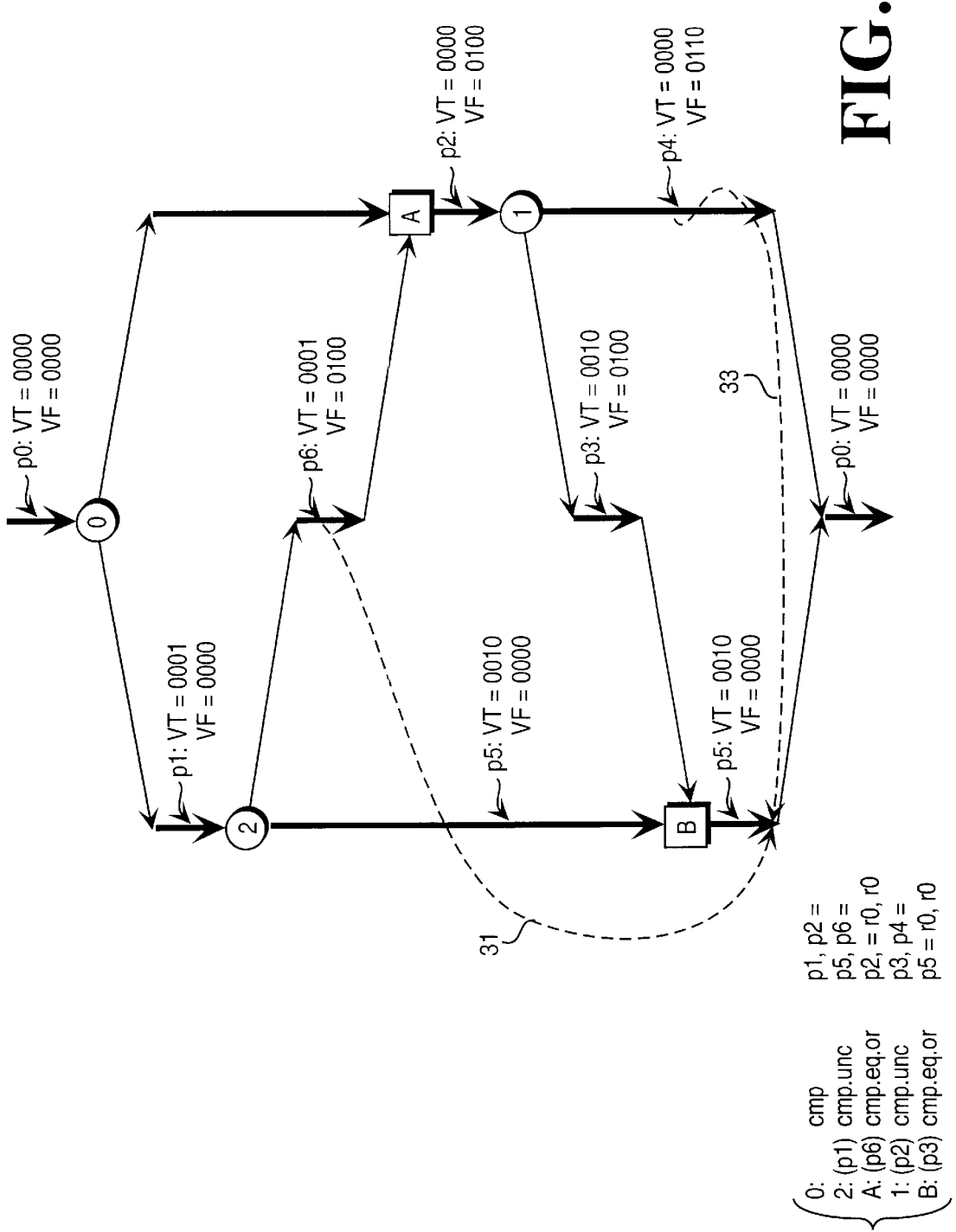
FIG. 7 is a diagram of bit vectors and possible dependencies that illustrates the present invention (nested hammock example).

Yet another example, this one illustrating forks and joins corresponding to the code listing of FIG. 6, is shown in the diagram of FIG. 7. In this instance, dashed line 31 represents that a possible dependence exists between the two instructions since application of the expression produces a zero result. That is, $$VT1 \wedge VT2 = 0011$$
$$VF1 \wedge VF2 = \underline{0100}$$
$$0000$$

On the other hand, dashed line 33 represents that no dependence exists between the two instructions, as $$VT1 \wedge VT2 = 0010$$
$$VF1 \wedge VF2 = \underline{0110}$$
$$0010$$

In each of the foregoing examples it should be understood that the box being analyzed on linear blocks only. To put it another way, the present invention is applicable only to linear blocks, and not to trees of code, or code having loops or branches outside the block. Note that although the diagramed examples may appear non-linear, they really are not. The use of branching arrows in the Figures denotes that the instructions are predicated. In other words, predication is represented in the drawings by forks without jumping outside of the block of code. In actuality, the instructions are written sequentially.

I claim:

1. A method for detecting independent predicated instructions comprising:

associating all instructions within a block of code with true and false bit vectors having bit locations that correspond to instructions that produce pairs of mutually exclusive predicates;

computing whether (I1VecTrue^I2VecTrue)&(I1VecFalse^I2VecFalse)!=0;

where I1VecTrue and I2VecTrue are true bit vectors associated with first and second instructions, and I1VecFalse and I2VecFalse are false bit vectors associated with the first and second instructions, respectively; & indicates a logical AND operation; ^ indicates an EXCLUSIVE-OR operation; and !=0 indicates a non-zero result; if so, the first and second instructions are independent.

2. The method of claim 1 wherein the true and false bit vectors each have a length comprising a machine word.

3. The method of claim 2 wherein the machine word is 64-bits.

4. The method of claim 1 wherein for each instruction that sets a pair of mutually exclusive predicates, a corresponding bit in the true bit vector is set to one for a corresponding true predicate.

5. The method of claim 4 wherein each instruction that sets a pair of mutually exclusive predicates comprises a compare instruction.

6. The method of claim 5 wherein each predicate register is one bit long.

7. The method of claim 6 wherein the instruction is executed only if the associated predicate register has a true value.

8. The method of claim 6 wherein the instruction is equivalent to a no-operation instruction if the associated predicate register has a false value.

9. The method of claim 1 wherein for each instruction that sets a pair of mutually exclusive predicates, a corresponding bit in the false bit vector is set to one for a corresponding false predicate.

10. The method of claim 1 wherein each instruction within the block has an associated predicate register.

11. A method for detecting independent predicated instructions comprising:

characterizing a predication status of instructions within a block of code by building true and false bit vectors, each instruction of a first type that produces a pair of mutually exclusive predicates being assigned a new bit location within the true and false bit vectors;

associating all instructions predicated by the pair of mutually exclusive predicates with the true and false bit vectors;

computing whether $$(I1VecTrue \char`\^ I2VecTrue) \& (I1VecFalse \char`\^ I2VecFalse)!=0;$$

where I1VecTrue and I2VecTrue are true bit vectors associated with first and second instructions, and I1VecFalse and I2VecFalse are false bit vectors associated with the first and second instructions, respectively; & indicates a logical AND operation; ^ indicates an EXCLUSIVE-OR operation; and !=0 indicates a non-zero result; if so, the first and second instructions are independent.

12. The method of claim 11 wherein the first type of instruction comprises a compare instruction.

13. The method of claim 11 wherein the true and false bit vectors each have a length comprising a machine word.

14. The method of claim 11 wherein the machine word is 64-bits.

15. The method of claim 11 wherein for each instruction that sets a pair of mutually exclusive predicates, a corresponding bit in the true bit vector is set to one for a corresponding true predicate.

16. The method of claim 11 wherein for each instruction that sets a pair of mutually exclusive predicates, a corresponding bit in the false bit vector is set to one for a corresponding false predicate.

17. The method of claim 11 wherein each instruction within the block has an associated predicate register.

18. The method of claim 17 wherein each associated predicate register is one bit long.

19. The method of claim 18 wherein the instruction is executed only if the associated predicate register has a true value.

20. The method of claim 18 wherein the instruction is equivalent to a no-operation instruction if the associated predicate register has a false value.

21. The method of claim 11 wherein the first type of instruction comprises a test bit instruction.

22. A method for detecting independent predicated instructions comprising:

building true and false bit vectors for each instruction that produces a pair of mutually exclusive predicates, wherein a bit in the true bit vector is set to one for a corresponding true predicate and a bit in the false bit vector is set to one for a corresponding false predicate;

associating all instructions predicated by the pair of mutually exclusive predicates with the true and false bit vectors;

computing whether $$(I1VecTrue \char`\^ I2VecTrue) \& (I1VecFalse \char`\^ I2VecFalse)!=0;$$

where I1VecTrue and I2VecTrue are true bit vectors associated with first and second instructions, and I1VecFalse and I2VecFalse are false bit vectors associated with the first and second instructions, respectively; & indicates a logical AND operation; ^ indicates an EXCLUSIVE-OR operation; and !=0 indicates a non-zero result; if so, the first and second instructions are independent.

* * * * *

UNITED STATES PATENT AND TRADEMARK OFFICE
CERTIFICATE OF CORRECTION

PATENT NO. : 6,360,316 B1
DATED : March 19, 2002
INVENTOR(S) : Baraz

It is certified that error appears in the above-identified patent and that said Letters Patent is hereby corrected as shown below:

Column 2,
Line 9, delete "it", insert -- if --.
Line 11, delete "It", insert -- If --.

Column 4,
Line 51, delete "12", insert -- I2 --.

Signed and Sealed this

Sixth Day of August, 2002

*Attest:*

JAMES E. ROGAN
*Attesting Officer*   *Director of the United States Patent and Trademark Office*